US010812867B2

(12) United States Patent
Fisher et al.

(10) Patent No.: US 10,812,867 B2
(45) Date of Patent: *Oct. 20, 2020

(54) DISCOVERING AND DISPLAYING MEDIA CONTENT RELATED TO AN ELECTRONIC DOCUMENT

(71) Applicant: GOOGLE LLC, Mountain View, CA (US)

(72) Inventors: Dave Scott Fisher, Mountain View, CA (US); Vincent Dureau, Palo Alto, CA (US); William Noah Schilit, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/532,202

(22) Filed: Aug. 5, 2019

(65) Prior Publication Data

US 2019/0379946 A1    Dec. 12, 2019

Related U.S. Application Data

(63) Continuation of application No. 15/614,449, filed on Jun. 5, 2017, now Pat. No. 10,375,449, which is a continuation of application No. 13/728,985, filed on Dec. 27, 2012, now Pat. No. 9,674,583.

(60) Provisional application No. 61/665,259, filed on Jun. 27, 2012.

(51) Int. Cl.
*G06F 3/048* (2013.01)
*H04N 21/658* (2011.01)
*H04N 21/41* (2011.01)
*H04N 21/436* (2011.01)
*H04N 21/4782* (2011.01)
*H04N 21/482* (2011.01)

(52) U.S. Cl.
CPC ..... *H04N 21/6581* (2013.01); *H04N 21/4104* (2013.01); *H04N 21/43615* (2013.01); *H04N 21/4782* (2013.01); *H04N 21/482* (2013.01)

(58) Field of Classification Search
None
See application file for complete search history.

(56) References Cited

U.S. PATENT DOCUMENTS 6,757,707 B1 *  6/2004  Houghton ............ H04N 5/4401
                                                    348/E5.105
6,760,043 B2 *  7/2004  Markel ................. H04N 7/088
                                                    348/E5.006

(Continued)

*Primary Examiner* — Hua Lu
(74) *Attorney, Agent, or Firm* — Morgan, Lewis & Bockius LLP

(57) ABSTRACT

Systems, computer-readable storage mediums, and methods for discovering and displaying media content related to an electronic document. At a first computing device, document identifying information—which is one of: at least a portion of a network identifier or source code for the electronic document—for the electronic document is obtained. One or more media entities associated with the electronic document are then obtained from a server. A representation of a subset of the media entities is displayed, and a user selection from the representation of a respective media entity from the subset is obtained. In response, the respective media entity is displayed.

20 Claims, 10 Drawing Sheets

(56) References Cited

U.S. PATENT DOCUMENTS

| | | | | |
|---|---|---|---|---|
| 8,667,540 B2* | 3/2014 | Hoshall | H04N 7/17336 | 715/738 |
| 8,736,764 B2* | 5/2014 | Amundsen | H04N 21/6125 | 348/564 |
| 8,776,118 B1* | 7/2014 | Rashkovskiy | H04N 5/44543 | 725/110 |
| 2001/0038392 A1* | 11/2001 | Humpleman | H04L 41/22 | 715/733 |
| 2002/0010932 A1* | 1/2002 | Nguyen | H04N 5/44543 | 725/51 |
| 2002/0145621 A1* | 10/2002 | Nguyen | H04N 21/4622 | 715/718 |
| 2004/0117821 A1* | 6/2004 | Karaoguz | H04L 65/4076 | 725/37 |
| 2004/0117831 A1* | 6/2004 | Ellis | H04N 21/4782 | 725/53 |
| 2008/0028336 A1* | 1/2008 | Maruyama | H04N 7/163 | 715/808 |
| 2008/0077955 A1* | 3/2008 | Haberman | H04N 7/17318 | 725/35 |
| 2008/0098433 A1* | 4/2008 | Hardacker | H04N 21/482 | 725/52 |
| 2008/0120501 A1* | 5/2008 | Jannink | G06F 16/40 | 713/163 |
| 2009/0198504 A1* | 8/2009 | Schmidt | G06Q 50/22 | 705/317 |
| 2010/0138761 A1* | 6/2010 | Barnes | H04N 21/4788 | 715/764 |
| 2010/0205643 A1* | 8/2010 | Raftelis | H04N 21/41407 | 725/110 |
| 2011/0041071 A1* | 2/2011 | Sudoh | G06F 16/4393 | 715/739 |
| 2011/0099263 A1* | 4/2011 | Patil | H04N 21/4532 | 709/224 |
| 2011/0302603 A1* | 12/2011 | Sugai | H04N 21/6581 | 725/38 |
| 2012/0084149 A1* | 4/2012 | Gaudiano | G06Q 30/0256 | 705/14.54 |
| 2012/0204093 A1* | 8/2012 | Habarakada | G06F 16/972 | 715/234 |
| 2012/0257110 A1* | 10/2012 | Amundsen | H04N 21/4622 | 348/564 |
| 2012/0303629 A1* | 11/2012 | Klein | G06F 16/907 | 707/741 |
| 2013/0117677 A1* | 5/2013 | St. Jacques, Jr. | G06F 3/00 | 715/738 |

* cited by examiner

Media entities
216

| Content title | Type | Year | Rating | Thumbnail (or link) | Description |
|---|---|---|---|---|---|
| Dictator | Movie | 2012 | 5 | www.imdb.com/dictator.jpg | Most recent release, HD version |
| Fox News (Live) | TV programming | 2012 | 9 | www.foxnews.com | Live news from Fox. No spin zone. |
| Air Force One | Movie | 2005 | 2 | movie.com/airforceone | Thriller. Oscar nominated |
| Trip to Washington DC | Local media content | 2002 | 6 | | 2001 trip to DC with Liu family |
| State of the Union speech | Streaming media | 2002 | 8 | www.youtube.com/Rtf12S | 10,100 views. 200 comments |
| 2012 Election Watch (Live) | TV programming | 2012 | 9 | cspan.org/election.html | Live coverage of vote counting (CA) |

Figure 2B

DISCOVERING AND DISPLAYING MEDIA CONTENT RELATED TO AN ELECTRONIC DOCUMENT

RELATED APPLICATIONS

This application is a continuation of U.S. patent application Ser. No. 15/614,449, filed Jun. 5, 2017, which is a continuation of U.S. patent application Ser. No. 13/728,985, filed Dec. 27, 2012, now U.S. Pat. No. 9,674,583, issued Jun. 6, 2017, which claims priority to U.S. Provisional Patent Application No. 61/665,259, filed Jun. 27, 2012, which are incorporated by reference herein in their entirety.

TECHNICAL FIELD

The disclosed implementations relate generally to discovering and displaying media content related to an electronic document.

BACKGROUND

While viewing an electronic document, such as a web site, a user often becomes interested in searching and viewing other information related to the electronic document. For example, when browsing a movie rating website, a user might want to watch movies or TV programs mentioned by the website on his or her TV. Typically, however, to view on a TV media content related to a document displayed by a computer, a user would need to first suspend their browsing activity on the computer, and then search for the related media content on the TV. During this process, users are inconvenienced because they are required to take actions outside the browsing experience. Furthermore, users may also become frustrated by the additional TV search process and abandon their effort to view the TV content altogether.

SUMMARY

Systems, methods, and non-transitory computer readable storage medium (server side and client side) for discovering and displaying media content related to an electronic document are hereby disclosed.

In one aspect, a method for discovering and displaying media content related to an electronic document comprises: at a first computing device (e.g., a client device) having one or more processors and memory storing one or more programs for execution by the one or more processors: obtaining document identifying information for an electronic document, wherein the document identifying information is one of: at least a portion of a network identifier or source code for the electronic document; obtaining from a server one or more media entities associated with the electronic document, wherein the media entities correspond to media content including scheduled TV programming, streaming media or locally stored media; displaying, on the first computing device, a representation of at least a subset of the one or more media entities; obtaining a user selection from the representation of a respective media entity from the at least a subset of the one or more media entities; and in response to the user selection, sending selection information identifying the respective media entity to a second computing device, the second computing device being configured to access and display respective media content corresponding to the respective media entity based on the selection information. In some implementations, the above-described steps are performed by a browser plug-in.

In some implementations, the electronic document is an electronic document opened in a document application on the first computing device. In some implementations, the document application is a web browser and the electronic document is a web page.

In some implementations, the method further includes: when the document identifying information includes at least a portion of a media content link that is readily identifiable by the first computing device, directly obtaining at the first computing device media entity associated with the at least a portion of the media content link, without involvement of the server.

In some implementations, when the document identifying information is the at least a portion of a network identifier, the one or more obtained media entities include media entities recognized by a search engine while previously indexing the web page.

In some implementations, when the document identifying information is the source code of the electronic document, the one or more obtained media entities include entities obtained by parsing the source code of the electronic document.

In some implementations, the one or more media entities are obtained based at least in part on one or more filtering criteria.

In some implementations, the method also includes: obtaining a media entity that is related to the one or more media entities; and displaying, on the first computing device, a representation of the related media entity.

In some implementations, the sending of the selection information is done via a local connection, from the first computing device, to the second computing device.

In some implementations, the method further includes: during a display of the respective media content on the second computing device: receiving, at the first computing device, a second user selection, and sending a remote control command modifying the display of the respective media content, in accordance with the second user selection, to the second computing device.

In some implementations, obtaining one or more media entities associated with the electronic document includes: sending a request to the server for media entities associated with the electronic document, the request including the document identifying information; and receiving the one or more media entities from the server.

In addition, a client system and a non-transitory computer readable storage medium storing one or more programs, which when executed by a computer, cause the computer to perform one or more steps of the above-described methods are also disclosed.

In another aspect, a method for discovering and displaying media content related to an electronic document comprises: at a server system (e.g., a server) having one or more processors and memory storing one or more programs for execution by the one or more processors: receiving, from a first computing device, document identifying information for an electronic document, wherein the document identifying information is one of: at least a portion of a network identifier, or source code for the electronic document; in response to receiving the document identifying information: identifying one or more media entities associated with the electronic document, wherein the media entities correspond to media content including scheduled TV programming, streaming media or locally stored media; and sending at least a subset of the one or more entities to the first computing device for displaying a presentation thereof.

In some implementations, the electronic document is an electronic document opened in a document application on the first computing device. In some implementations, the document application is a web browser and the electronic document is a web page.

In some implementations, when the document identifying information is the at least a portion of a network identifier, the one or more identified media entities include media entities recognized by a search engine while previously indexing the web page.

In some implementations, when the document identifying information is the source code of the electronic document, the one or more identified media entities include entities obtained by parsing the source code of the electronic document.

In some implementations, the one or more media entities are identified based at least in part on one or more filtering criteria.

In some implementations, the method also includes: identifying a media entity that is related to the one or more media entities; and sending the related media entity to the first computing device for displaying a presentation thereof.

In addition, a server system and a non-transitory computer readable storage medium storing one or more programs, which when executed by a computer, cause the computer to perform one or more steps of the above-described methods are also disclosed.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 2B is a block diagram illustrating an example of media entities, in accordance with some implementations.

DETAILED DESCRIPTION

Figure 1:
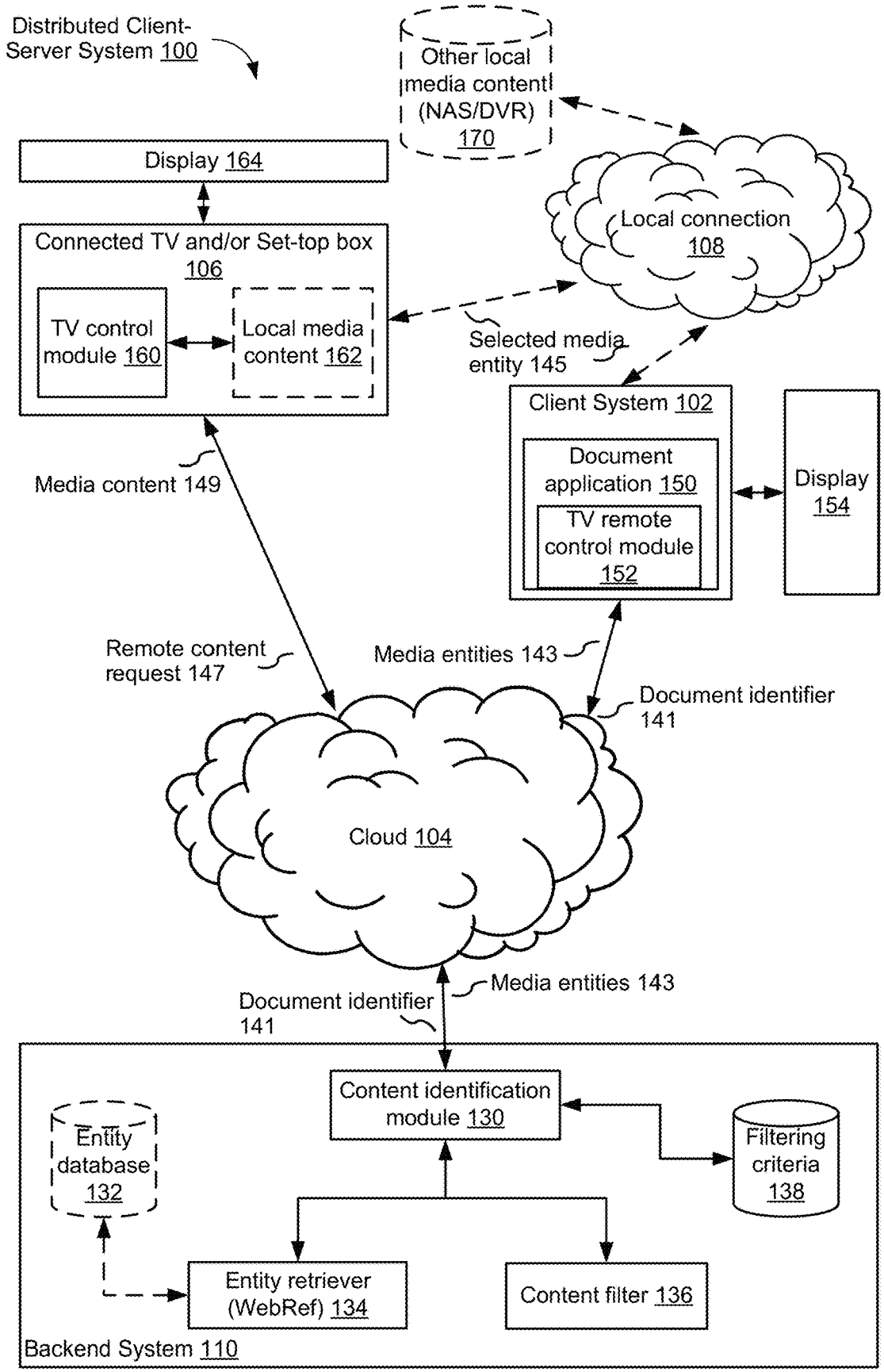
FIG. 1 is a block diagram illustrating a distributed client-server system, in accordance with some implementations.

The implementations described herein provide techniques for discovering, using a first device media content related to an electronic document, such as a web page, text file or word processor document, and then playing selected items of the discovered media content on a different device, such as an Internet-connected TV or set-top box.

In some implementations, a client module obtains document identifying information for an electronic document that is being displayed on a first computing device. For example, the first computing device might be a laptop or tablet computer, and the electronic document might be a web page about a subject that is associated with one or more items of media content. For example, the web page might relate to a historical figure, such as Abraham Lincoln. In some implementations, the document identifying information is at least a portion of a network identifier (such as a web page URL) or source code for the electronic document (e.g., the HTML code for a web page).

The first computing device interacts with a server/backend system to obtain one or more media entities associated with the electronic document. In some implementations, the first computing device initiates the process of obtaining the media entities by sending (either automatically, without user interaction, or upon user request) the server/backend system the document identifying information. The server/backend system then identifies the media entities by processing the electronic document identified by the document identifying information. In some implementations, the media entities correspond to media content, including scheduled TV programming, streaming media or locally stored media. For example, in the case of a web page about Abraham Lincoln, each of the media entities would relate to TV programs or movies (including movies that are streamed from Internet sites) about Abraham Lincoln, or subjects related to Abraham Lincoln discussed on the same web page.

Next, in some implementations, a representation of at least a subset of the one or more media entities is displayed by a program module executing on the first computing device. For example, referring again to the web page about Abraham Lincoln, the program module would display a list of media items corresponding to one or more of the media entities about Abraham Lincoln returned by the server/backend system. The program module would then enable a user to select a particular media entity from the representation/list for playback on a TV or second computing device different from the first computing device. In some implementations, the second computing device might be an Internet-connected TV, set-top box or a media player device with associated software that enables playback of network or Internet-based media content. In some implementations, the first and second computing devices are connected to the same local area network, over which they exchange information, such as information on selected TV content. In response to the user selection, a program module on the first computing device sends selection information identifying the particular media entity selected by the user to the second computing device that is configured to access and display the particular media content. In this way, a user is able to seamlessly identify, from a first computing device, media content associated with a web page or other electronic document being accessed from that device and then play that content on a second computing device, such as a connected TV, or set top box that outputs content to a local TV or display. Additional details of implementations are now described in relation to the Figures.

FIG. 1 is a block diagram illustrating a distributed client-server system 100 for discovering and displaying media content related to an electronic document. In some implementations, the distributed client-server system 100 includes the client system 102 (referred to herein as "client 102"), the cloud 104, the connected TV and/or Set-top box 106 (referred to herein as "TV and/or STB 106"), the local connection 108, the backend systems 110 (referred to herein as "backend 110"), and, optionally, other local media content (NAS/DVR) 170.

In some implementations, the client 102 includes a document application 150 (e.g., a web browser), which opens and displays an electronic document for a user to view, or loads the electronic document in the background. In some implementations, the document application 150 is a general purpose Internet browser (sometimes called a Web browser) having a browser window used for viewing web pages, and a representation of media entities associated with the web pages. In some implementations, the document application 150 is a document editor or viewer (e.g., Microsoft Word, or Google Docs). In some implementations, the client 102 sends information identifying the electronic document (e.g., the document identifier 141, such as, at least a portion of a network identifier or source code of the electronic document) to the backend 110, via the cloud 104, and receives one or more media entities 143 associated with the electronic document. In some implementations, the client 102 also displays a representation of the received media entities.

In some implementations, the document application 150 also includes a TV remote control module 152. In some implementations, after displaying the representation of media entities, the client 102, through the TV remote control module 152, receives a user selection of a respective entity (e.g., the selected media entity 145), and sends selection information to the TV and/or STB 106, where media content (e.g., the media content 149) corresponding to the selected respective media entity is displayed. In some implementations, the TV remote control module 152 also sends user selection information that modifies the display of media content on the TV and/or STB 106. In some implementations, the client 102 is also connected to a display 154, which displays the electronic document (e.g., a web page) for a user to view. In some embodiment, the display 154 is a computer monitor or display.

In some implementations, the TV and/or STB 106 includes a TV and/or a set-top box connected thereto. In some implementations, the TV and/or STB 106 is a Google TV. In some implementations, the TV and/or STB 106 includes a TV control module 160 and, optionally, local media content 162. In some implementations, the TV control module 160 receives user selection of a respective media entity, or control command (e.g., remote control command) from the client 102, via local connection 108, and retrieves and displays media content in accordance therewith. In some implementations, the TV control module 160 retrieves media content (e.g., using the remote content request 147) from the backend 110 via the cloud 104 (e.g., the Internet).

In some implementations, the TV control module 160 also retrieves media content locally from local media content 162, e.g., when the TV and/or STB 106 is not connected to the cloud 104, or when the media content selected by the user is stored locally. In some implementations, the local media content 162 includes media content stored locally. In some implementations, the local media content 162 includes streaming media previously downloaded, TV programming previously recorded on a local DVR, or media content created and saved locally by a user (e.g., home-made audio and/or video clips). In some implementations, the TV control module 160 also access other local media content (NAS/DVR) 170, which is not included in the TV and/or STB 106. For example, in some implementations, the other local media content (NAS/DVR) 170 includes home-made audio and/or video clips saved on a plug-and-play storage medium. In some implementations, the TV and/or STB 106 is also connected to a display 164, which displays media content, in accordance with user selection. In some embodiment, the display 154 is a TV monitor or display.

In some implementations, the backend 110 includes a content identification module 130, an entity database 132 (optionally), an entity retriever (or WebRef) 134, a content filter 136, and filtering criteria 138. In some implementations, the content identification module 130 receives document identifying information (which identifies an electronic document e.g., the document identifier 141), and identifies entities—media entities 143 and/or non-media entities—associated with the electronic document. In some implementations, the entity database 132 stores entities (media entities and/or non-media entities) associated with electronic documents. In some implementations, the entity database 132 is local to the backend 110. In other implementations, the Entity database 132 is remote from, but accessible to, the backend 110. In some implementations, in accordance with information received from the content identification module 130, the entity retriever (or WebRef) 134 retrieves entities from the entity database 132. In some implementations, entities retrieved by the entity retriever (or WebRef) 134 are filtered by the content filter 136, for example, to filter out non-media entities, or to produce a certain category of media entities (e.g., media entities other than TV programming). In some embodiment, the content filter 136 filters entities by first retrieving one or more filters from the filtering criteria 138, and then selectively identifying one or more entities from all the retrieved entities in accordance with the filters.

In some implementations, the cloud 104 optionally includes the Internet, one or more local area networks (LANs), one or more wide area networks (WANs), other types of networks, or a combination of such networks. In some implementations, Local connection 108 optionally includes connections by infrared signals, radio frequency signals, local area networks (LANs), Bluetooth, serial or parallel cable, or a combination of thereof.

Figure 2A:
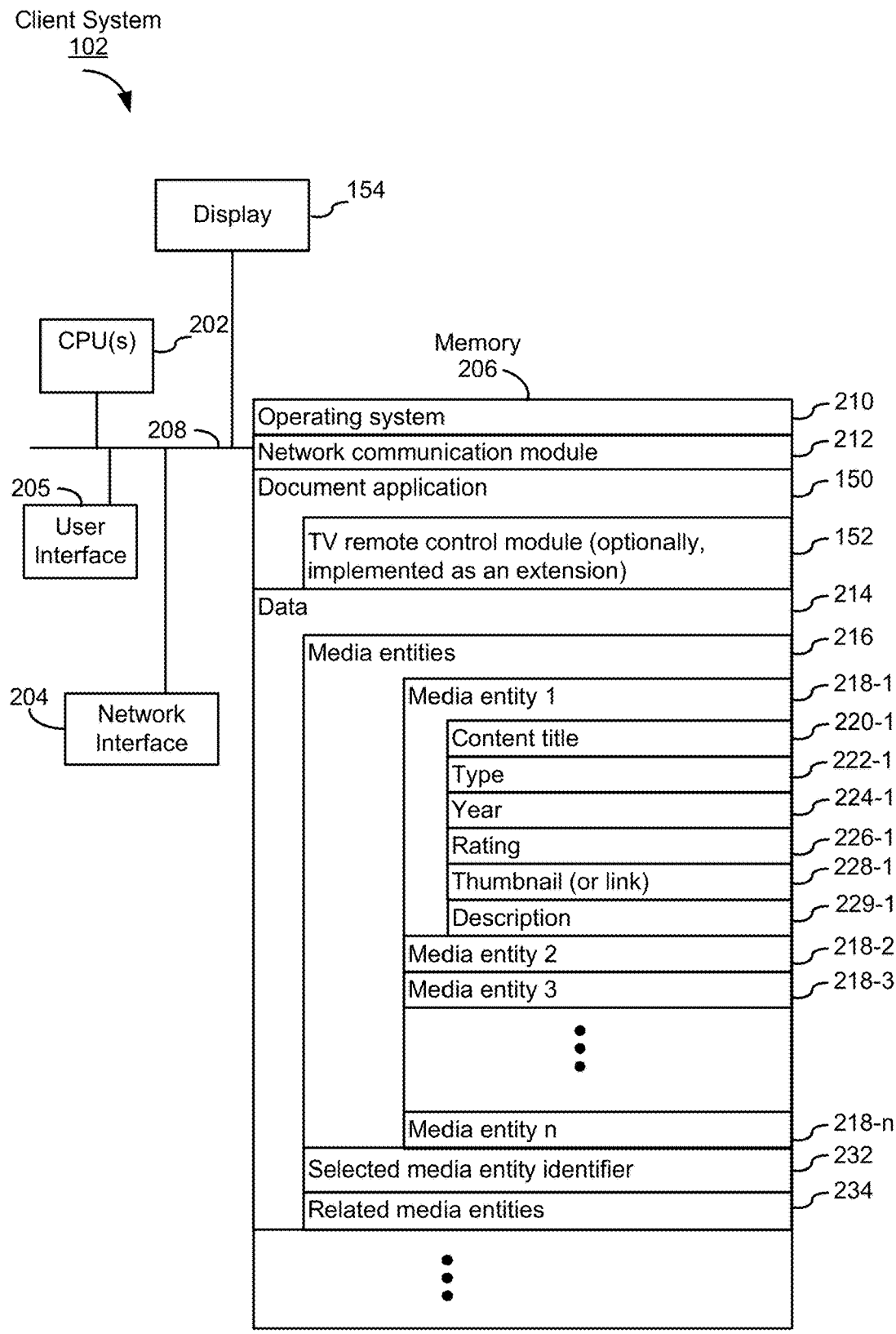
FIG. 2A is a block diagram illustrating a client, in accordance with some implementations.

FIG. 2A is a block diagram illustrating a client system 102 in accordance with some implementations. The client 102 typically includes one or more processing units CPU(s) 202 (also herein referred to as processors), one or more network or other Communication Interfaces 204, memory 206, an user interface 205 comprising a display device and a keyboard, mouse, touchpad, touchscreen or other input device, and one or more communication Buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

an operating system 210, which includes procedures for handling various basic system services and for performing hardware dependent tasks;

a network communication module (or instructions) 212 for connecting client 102 with other devices (e.g., backend 110 or TV and/or STB 106) via one or more network interfaces 204 (wired or wireless), the local connection 108 (FIG. 1), and the cloud 104 (FIG. 1);

a document application 150 for loading, opening or displaying electronic documents—e.g., web pages, Word documents or Google documents—on the client 102, including in some implementations:

- a TV remote control module 152—optionally implemented as an extension to document application 150, such as a browser plug-in—for sending document identifying information to backend 110, and receiving associated media entities therefrom. In some implementations, TV remote control module 152 also receives a user selection of a respective media entity, and sends user selection information to TV and/or STB 106;

data 214 stored on the client 102, which includes:

- media entities 216 for including media entity information retrieved from the entity database 132 (returned by the backend 110) or media entities identified by the client 102, including:
  - media entities i (e.g., media entities 218-1 through 218-n) for including information concerning media content corresponding to one or more media entities, each including one or more of the following media characteristics (this information being used by the TV remote control module 152 to populate a displayed list of media entities associated with an electronic document opened in the document application 150):
    - a content title 220-i for including title of the media content corresponding to the media entity 1;
    - a type 222-i for including information indicating one or more category to which the corresponding media content belongs;
    - a year 224-i for identifying a year in which the corresponding media content was published, created or broadcasted;
    - a rating 226-i for identifying a rating associated with the corresponding media content;
    - a thumbnail (or link) 228-i corresponding to a thumbnail (e.g., a logo or an audio/video preview) of the corresponding media content, or a link thereto.
    - a description 229-i for including a description of (e.g., a synopsis, a condensed or full review) the corresponding media content, or a link thereto.
  - a selected media entity identifier 232 for uniquely identifying an media entity selected by a user associated with the client 102 (the corresponding data for the selected media entity being transmitted to the connected TV 106, enabling the TV control module 160 to identify and initiate playback of the media content corresponding to selected media entity); and
  - related media entities for including media entities related to the media entities 216.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

FIG. 2B is a block diagram illustrating an example of media entities (e.g., the media entities 216 in FIG. 2A), in accordance with some implementations. In some implementations, media entities includes data returned from the server/backend system 110 following discovery by the server of media entities related to a web page being displayed at the client system 102. In some implementations, media entities include data formatted consistently with the JSON object model. In some implementations, media entities include content title, type, year, rating, thumbnail (or link), and description. In some implementations, the content title includes title information of a media entity, such as "Dictator" for the movie entity 252. In some implementations, the type identifies a category to which a media entity belongs, such as movie, TV programming, local media content. In some implementations, the year identifies a year in which the media content corresponding to a media entity is broadcasted or created, and the rating includes a rating associated with a media entity. In some implementations, thumbnail (or link) includes information for displaying a thumbnail (e.g., a logo or an audio/video preview) of the media content corresponding to a media entity, or a link to the thumbnail, and Description includes a synopsis of the corresponding media content. Generally, this information is used to populate a list of media entities associated with a particular electronic document opened in the document application 150 (the list being displayed by the remote control module 152), from which list a particular associated media entity can be selected for transmission to the connected TV. This media entity information is used by the connected TV or set-top box (including a Google TV device) to identify instances of media content 149 (FIG. 1) corresponding to the transmitted selected media entity information 145 (FIG. 1) to be displayed at the display 164.

Figure 3:
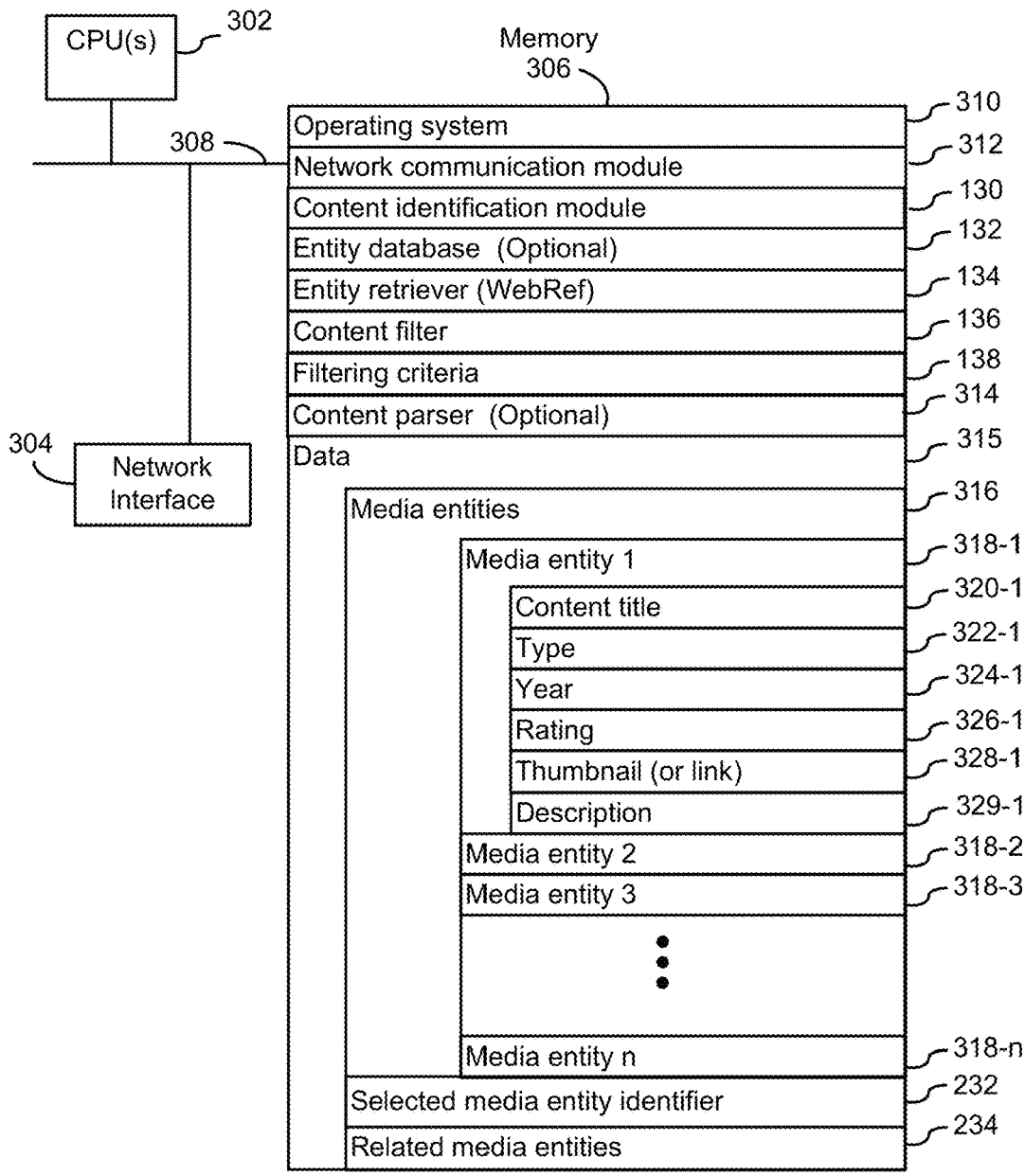
FIG. 3 is a block diagram illustrating a server (or a backend), in accordance with some implementations.

FIG. 3 is a block diagram illustrating the backend system 110 ("backend 110," also called a server), in accordance with some implementations. Backend 110 typically includes one or more processing units CPU(s) 302 (also herein referred to as processors), one or more network or other communications interfaces 308, the memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

data 315 stored on the backend 110, which includes:
  media entities 316 for including media entity information retrieved from the entity database 132, including:
    media entities i (e.g., media entities 318-1 through 318-$n$) for including information concerning media content corresponding to one or more media entities, each including one or more of the following media characteristics (this information being used by the TV remote control module 152 to populate a displayed list of media entities associated with an electronic document opened in the document application 150):
      a content title 320-$i$ for including title of the media content corresponding to the media entity 1;
      a type 322-$i$ for including information indicating one or more category to which the corresponding media content belongs;
      a year 324-$i$ for identifying a year in which the corresponding media content was published, created or broadcasted;
      a rating 326-$i$ for identifying a rating associated with the corresponding media content;
      a thumbnail (or link) 328-$i$ corresponding to a thumbnail (e.g., a logo or an audio/video preview) of the corresponding media content, or a link thereto.
      a description 329-$i$ for including a description of (e.g., a synopsis, a condensed or full review) the corresponding media content, or a link thereto.
    the selected media entity identifier 232 for uniquely identifying an media entity selected by a user associated with the client 102 (the corresponding data for the selected media entity being transmitted to the connected TV 106, enabling the TV control module 160 to identify and initiate playback of the media content corresponding to selected media entity); and
    the related media entities for including media entities related to the media entities 216.

Figure 6:
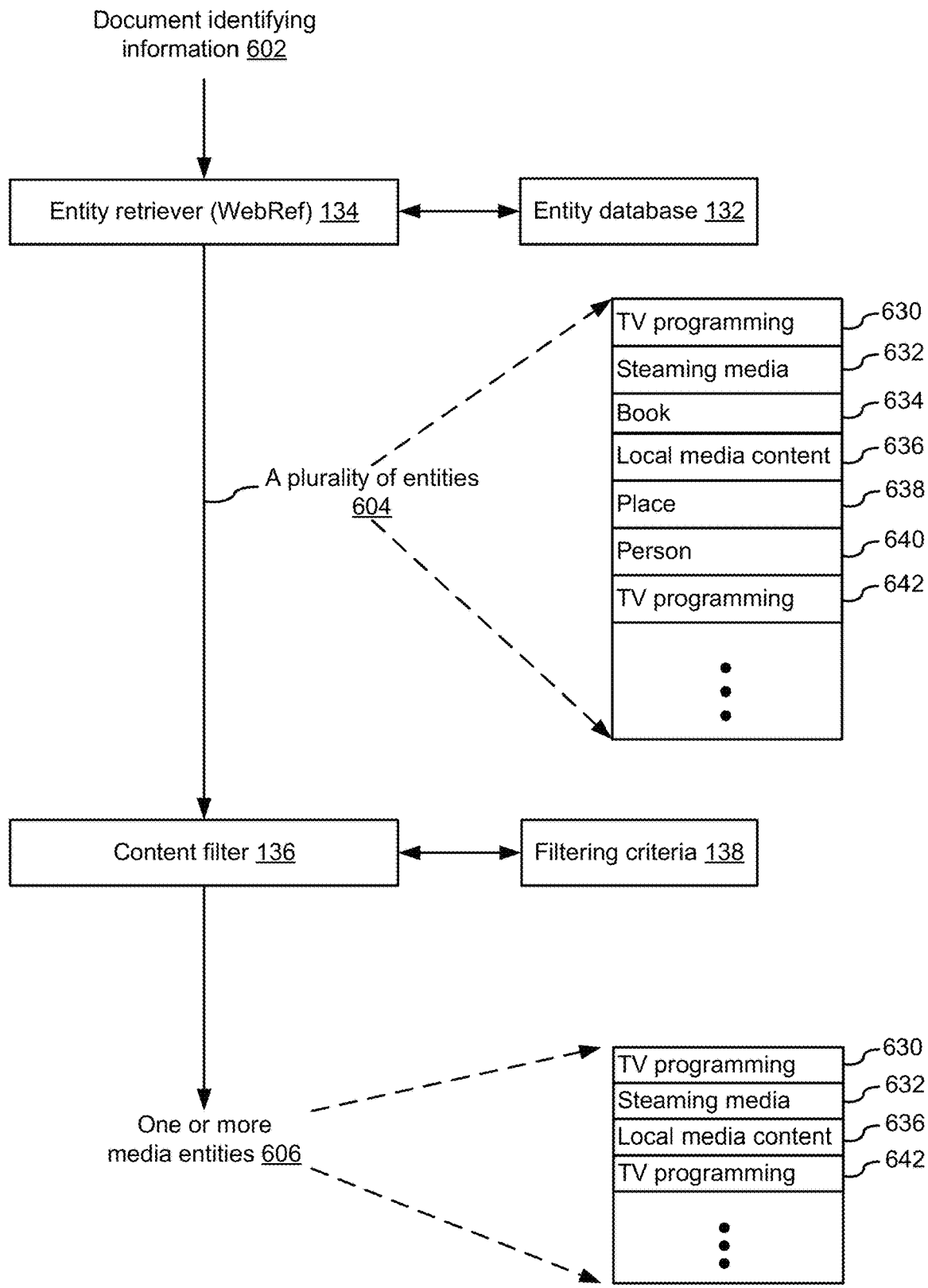
FIG. 6 is a block diagram illustrating an example of filtering media content related to an electronic document, in accordance with some implementations.

In some implementations, data 315 further includes entities other than media entities 316. For example, data 315, in some implementations, includes both media entities and non-media entities (FIG. 6). In some implementations, entities—media entities and/or non-media entities—returned from the entity database 132 is a superset of media entities sent to the client 102 (e.g., the media entities 143), because entities returned from the entity database 132, in some situations includes non-media entities, or entities that do not meet filtering criteria applied by the content filter 136.

In some implementations, one or more of the above identified elements are stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, Memory 306 optionally stores additional modules and data structures not described above.

Although FIG. 3 shows a "backend 110," also referred to as a server, FIG. 3 is intended more as functional description of the various features which may be present in backend system than as a structural schematic of the implementations described herein. In practice, and as recognized by those of ordinary skill in the art, items shown separately could be combined and some items could be separated.

Figure 4:
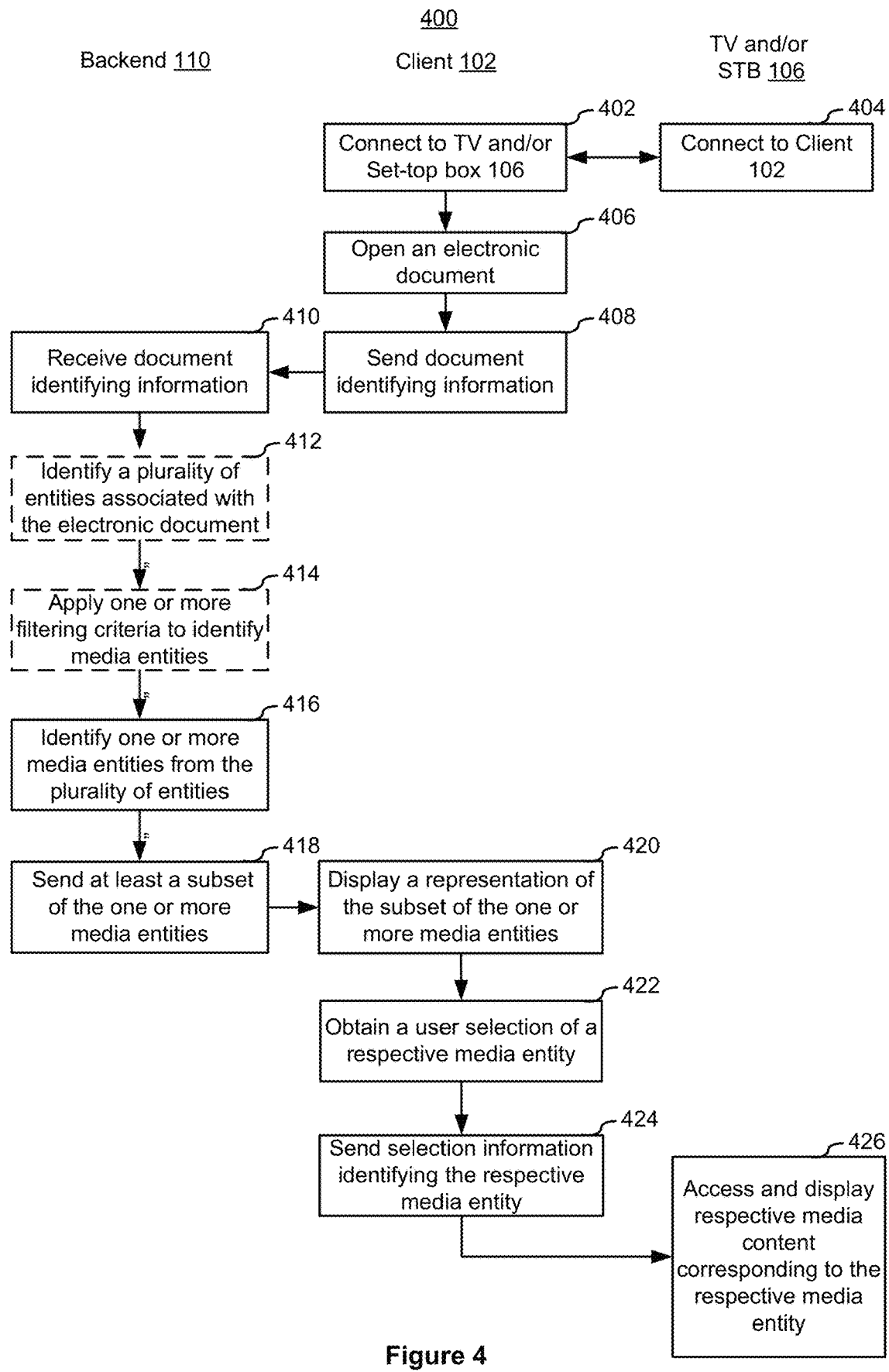
FIG. 4 is a flow diagram illustrating a method of discovering and displaying media content related to an electronic document in a client-server system, in accordance with some implementations.

FIG. 4 includes a flowchart illustrating a method for discovering and displaying media content related to an electronic document, in accordance with some implementations.

In some implementations, the client 102 first connects (402) to TV and/or STB 106, by sending log-in information (e.g., 702 in FIG. 7A) to TV and/or STB 106. After the log-in information is verified, TV and/or STB 106 is connected (404) to the client 102 through a communication session.

In some implementations, after the client 102 and the TV and/or STB 106 are connected, an electronic document is opened (406) or loaded on the client 102. In some implementations, the electronic document is displayed in foreground on the client 102 (e.g., visible to a user). In other implementations, the electronic document is loaded or opened in background (e.g., not visible to the user). In other implementations, the electronic document was opened or loaded on the client 102 before connection between the client 102 and the TV and/or STB 106 was established.

In some implementations, after the electronic document is opened, the client 102 sends (408) document indentifying information that identifies the electronic document to Backend 110. In some implementations, document indentifying information is one of: at least a portion of a network identifier (e.g., a portion of a URL) or source code for the electronic document (e.g., web page source code). In some implementations, a portion of a network identifier is sent to Backend 110, when the electronic document is also accessible to Backend 110, e.g., a public web page. In other implementations, source code for the electronic document is sent to Backend 110, when the electronic document is not accessible to Backend 110, e.g., a password protected web page, or an encrypted document.

After receiving (410) document identifying information from the client 102, the backend 110 identifies (412) a plurality of entities—media entities and/or non-media entities—associated with the electronic document (e.g., a movie, a person or a place mentioned in the web page displayed on the client 102). In some implementations, the backend 110 optionally applies (412) one or more filtering criteria (e.g., data from the filtering criteria 138) to the plurality of entities, e.g., to identify (416) one or more media entities from the plurality of entities. After one or more media entities are identified, the backend 110 sends (418) at least a subset of the one or more media entities along with presentation information, to the client 102, where a presentation of the subset of media entities are displayed (420). In some implementations, an media entity include information identifying the media entity, such as, a network address at which media content corresponding to the entity can be retrieved, or a channel on which media content is being broadcasted (e.g., the channel information 324 in FIG. 2).

In some implementations, the client 102 obtains (422) a user selection of a respective entity from the subset of media entities, and sends (424) selection information identifying the respective entity to the TV and/or STB 106. Based on the selection information, the TV and/or STB 106 accesses and displays (426) respective media content corresponding to the respective media entity.

Figure 5A:
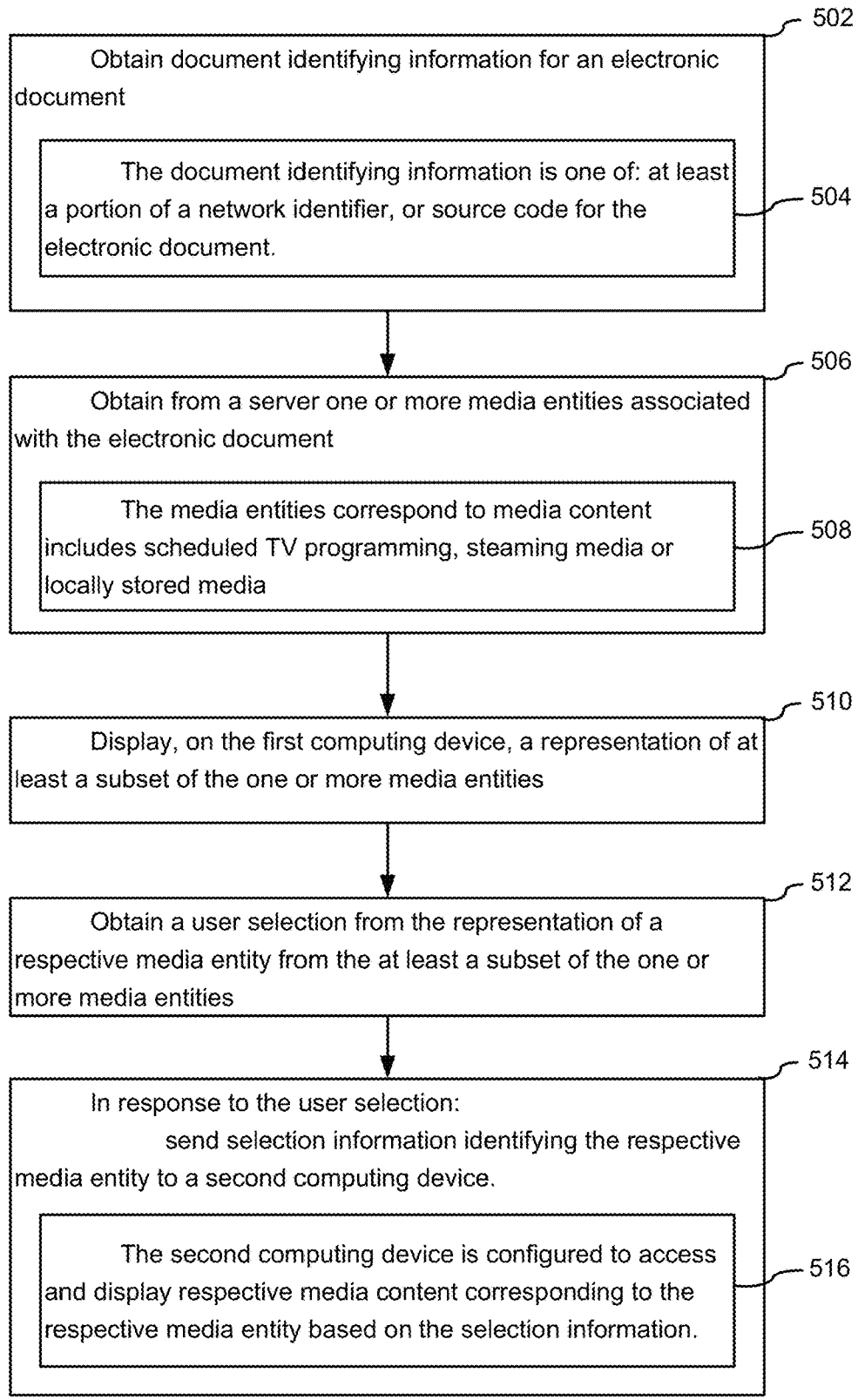
FIG. 5A is a flow chart illustrating a method of discovering and displaying media content related to an electronic document at a client, in accordance with some implementations.

FIG. 5A is a flow chart illustrating a method of discovering and displaying media content related to an electronic document at a client, in accordance with some implementations. In some implementations, at a first computing device (e.g., the client 102), document identifying information for an electronic document is obtained (502). In some implementations, the document identifying information is (504) one of: at least a portion of a network identifier or source code for the electronic document. In some implementations, the electronic document is an electronic document opened in a document application on the first computing device. In some implementations, the document application is a web browser and the electronic document is a web page.

In some implementations, in accordance with the document identifying information, one or more media entities associated with the electronic document are obtained (506) from a server (e.g., the backend 110). In some implementations, the media entities correspond to media content include (508) scheduled TV programming, streaming media or locally stored media. In some implementations, the first computing device (e.g., the client 102) obtains the one or more media entities by first sending a request to the server for media entities associated with the electronic document, the request including the document identifying information; and then receiving the one or more media entities from the server.

In some implementations, when the document identifying information is the at least a portion of a network identifier (e.g., a portion of a URL), the one or more obtained media entities include media entities recognized by a search engine while previously indexing the web page. For example, when the electronic document is also accessible to the server (e.g., a public web page accessible to the backend 110), and the electronic document (e.g., the public web page) has previously been indexed by a search engine (e.g., Google search engine), entities associated with the electronic document have already been identified and stored in the entity database 132. As such, after a portion of a URL is sent to the server, the server identifies one or more entities based on the portion of the URL by using the entity retriever (WebRef) 134 to retrieve entities associated with the electronic document from Entity database 132.

In other implementations, when the document identifying information is the source code of the electronic document, the one or more obtained media entities include entities obtained by parsing the source code of the electronic document. For example, when the electronic document is not accessible to the server by URL (e.g., a password protected document or web page), the source code of the electronic document (e.g., web page or document source code) is sent to the server, which identifies entities by first parsing the source code, using the content parser 314, and then retrieving entities from the entity database 132.

In still other implementations, when the document identifying information includes at least a portion of a media content link that is readily identifiable by the first computing device (e.g., a YouTube that is readily identifiable by the client 102), the first computing device directly obtains media entity associated with the at least a portion of the media content link, without involvement of the server. For example, when the a web page being viewed by a user includes YouTube links, because the syntax of these links are generally known or readily identifiable by the client 102, the client 102 identifies media entities (e.g., YouTube clip) on the web page, without sending the YouTube link to the server.

In some implementations, the first computing device then obtains (506) one or more media entities associated with the electronic document, for example, from the backend 110. In some implementations, the one or more media entities are obtained based at least in part on one or more filtering criteria. For example, in some situations, entities—both media entities and non-media entities—are first obtained, non-media entities are then filtered out, and media entities are sent to the client 102. In other situations, filters, such as top-ten viewed media content, are applied to filter out media entities that do not meet filtering criteria. Filters are applied so that the entities are selectively presented to the client 102, by type or by rating, so as to reduce burdens on a user when selecting media content she desires.

Figure 7A:
FIGS. 7A-7E are screen images illustrating example portions of a user interface for discovering and displaying media content related to an electronic document, in accordance with some implementations.
Figure 7B:
Figure 7C:
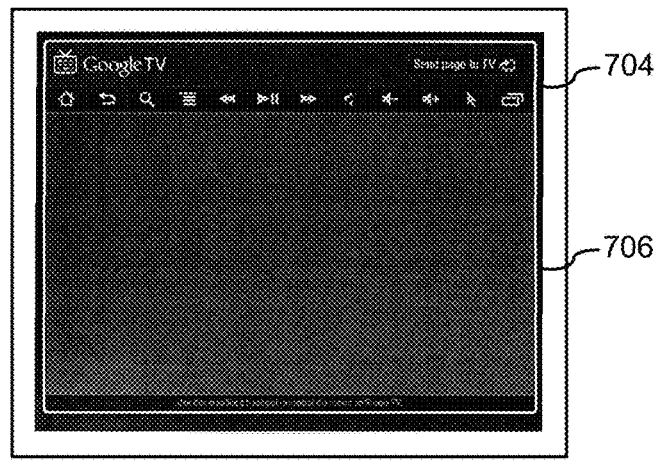
Figure 7E:
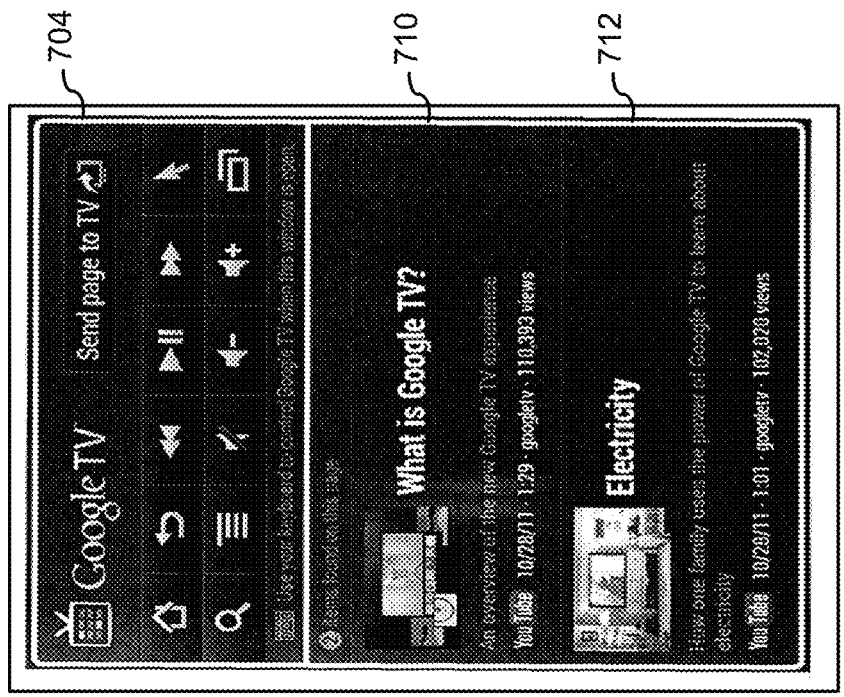
Figure 7D:
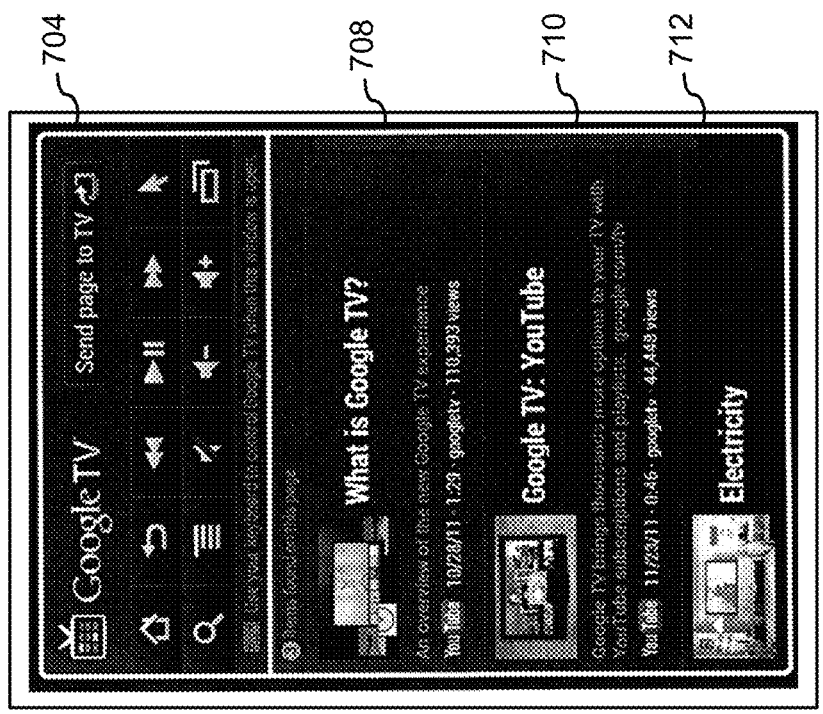

In some implementations, a representation of at least a subset of the one or more media entities is displayed (510) on the first computing device (e.g., 708, 710, and 712 in FIGS. 7D-7E).

In some implementations, a presentation of media entity related to the one or more media entities and also displayed on the first computing device. For example, in some situations, entities related to media entities associated with the electronic document are also displayed. For example, when a user is viewing a web page on a thriller movie, in addition to media entity corresponding to the thriller movie, media entity corresponding to a love movie that shares the same director with the thriller movie is also identified and presented for display on the client 102. This approach allows related content to be automatically displayed to a user, thus reducing burden on the user to search for the related content.

In some implementations, the first computing device then obtains (512) a user selection from the representation of a respective media entity from the at least a subset of the one or more media entities. For example, a user associated with the client 102 selects a movie entity (712 in FIG. 7) from the one or more media entities.

In some implementations, in response to the user selection, the first computing device (e.g., the client 102) sends (512) selection information identifying the respective media entity to a second computing device (e.g., the TV and/or STB 106). In some implementations, the selection information is sent via a local connection (e.g., the local connection 108), from the first computing device, to the second computing device. The second computing device is (516) configured to access and display respective media content corresponding to the respective media entity based on the selection information.

In some implementations, respective media content corresponding is then displayed on the second computing device. For example, after a user selects a YouTube clip (710 in FIG. 7D), the YouTube clip is then displayed on the TV and/or STB 106. In some implementations, during the display of the respective media content on the second computing device, the first computing device receives a second user selection, and sends a remote control command modifying the display of the respective media content, in accordance with the second user selection, to the second computing device. For example, during the display of the YouTube clip, a user presses a fast-forward button on a control panel (e.g., 704 and 706 in FIGS. 7B-7C) displayed on the client 102, and a fast-forward command is then sent to the TV and/or STB 106, which fast-forwards the YouTube clip. This approach provides to user control over the media content being displayed on the TV and/or STB 160, in addition to the initial user selection of media entity.

In some implementations, the method describe above is performed at the first computing device, by a plug-in (e.g., a browser plug-in, such as the TV remote control module 152 in FIG. 1).

Figure 5B:
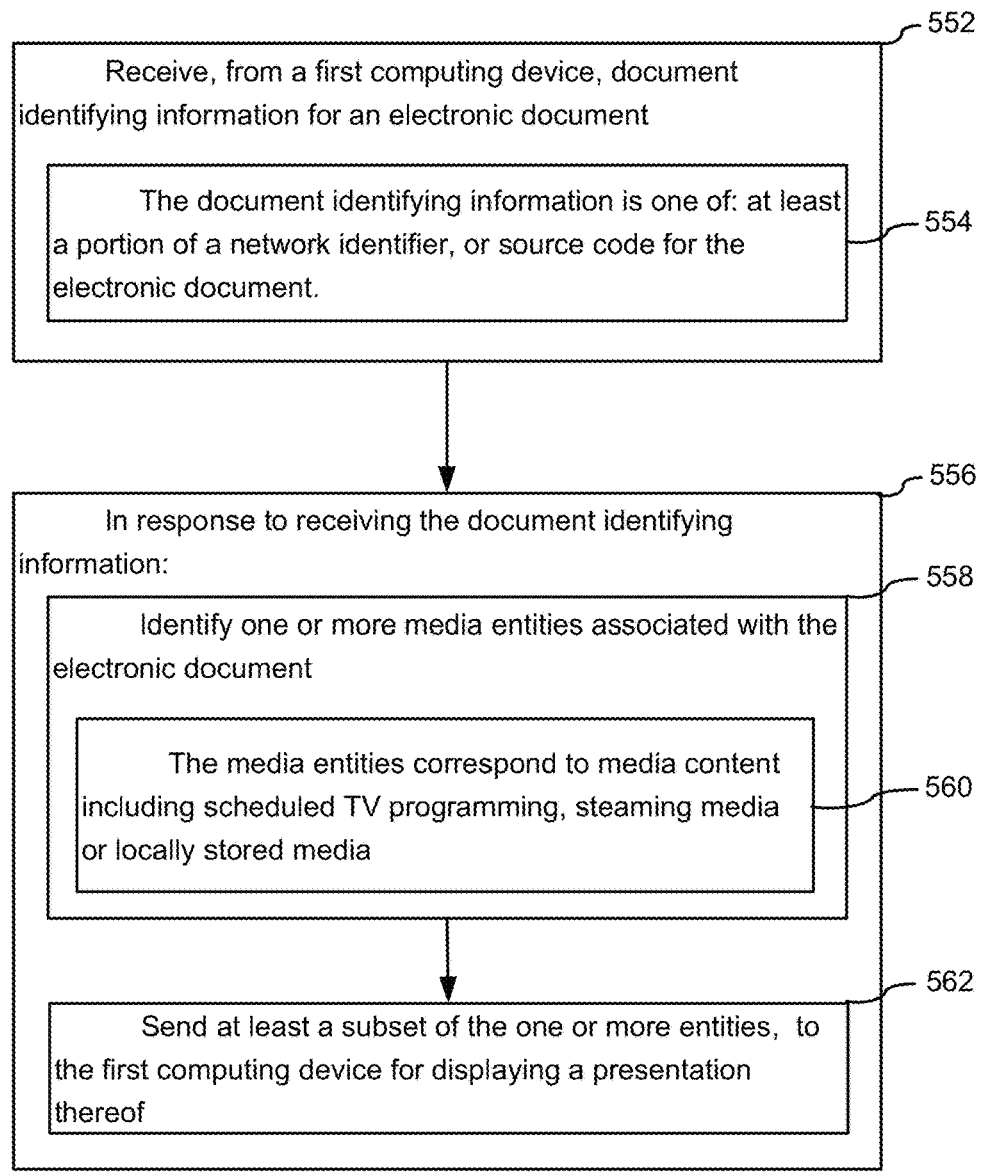
FIG. 5B is a flow chart illustrating a method of discovering and displaying media content related to an electronic document at a server, in accordance with some implementations.

FIG. 5B is a flow chart illustrating a method of discovering and displaying media content related to an electronic document at a server, in accordance with some implementations. In some implementations, at a server, document identifying information for an electronic document is received (552) from a first computing device. The document identifying information is (554) one of: at least a portion of a network identifier, or source code for the electronic document.

In some implementations, in response (556) to receiving the document identifying information: the server identifies (558) one or more media entities associated with the electronic document, and sends at least a subset of the one or more entities to the first computing device for displaying a presentation thereof. The media entities correspond (560) to media content including scheduled TV programming, streaming media or locally stored media.

In some implementations, the electronic document is an electronic document opened in a document application on the first computing device. In some implementations, the document application is a web browser and the electronic document is a web page.

In some implementations, when the document identifying information is the source code of the electronic document, the one or more identified media entities include entities obtained by parsing the source code of the electronic document. In other implementations, when the document identifying information is the at least a portion of a network identifier, the one or more identified media entities include media entities recognized by a search engine while previously indexing the web page.

In some implementations, the one or more media entities are identified based at least in part on one or more filtering criteria.

In some implementations, after one or more media entities associated with the electronic document are identified, the server (e.g., the backend 110) sends (562) at least a subset of the one or more media entities to the first computing device (e.g., the client 102) for displaying a presentation of the subset of the one or more media entities.

In some implementations, the server additional identifies a media entity that is related to the one or more media entities; and sends the related media entity to the first computing device for displaying a presentation thereof.

FIG. 6 is a block diagram illustrating an example of filtering media content related to an electronic document, in accordance with some implementations.

As shown in FIG. 6, after receiving the document identifying information 602 (e.g., a portion of a network identifier or source code), which identifies an electronic document, the entity retriever (WebRef) 134 retrieves A plurality of entities 604 associated with the electronic document, from the entity database 132.

In some implementations, entities retrieved from the entity database 132 include both media entity and non-media entity. As shown in FIG. 6, A plurality of entities 604 includes both media entities (e.g., the TV programming 630, the streaming media 632, the local media content 636, and the TV programming 642), and non-media entities (e.g., the book 634, the place 637, and the person 640).

In some implementations, after a plurality of entities 604 are retrieved, the content filter 136 retrieves one or more entity filters from the filtering criteria 138, and applies the filters to A plurality of entities 604. In some implementations, filters are applied to filter out non-media entities from a plurality of entities 604. In other implementations, filters are applied to filter out certain type of media entities from a plurality of entities 604, for example to filter out all local media content, because TV programmings and Streaming media are more likely carry live or recent content.

In some implementations, after filters are applied, one or more media entities 606 are selected from a plurality of entities 604. As shown in FIG. 6, in some implementations, the one or more media entities 606 include media content (e.g., TV programming 630, streaming media 632, local media content 636, and TV programming 642), and does not include non-media content.

FIGS. 7A-7E are screen images illustrating example portions of a user interface for discovering and displaying media content related to an electronic document, in accordance with some implementations.

In FIG. 7A, the log-in panel 702 is an example of a user interface, through which a user associated with Client 102 connects the client 102 with the TV and/or STB 106. For example, this is done by a user entering a pairing code "1234" that establishes a link, typically over a local area network, between the client 102 and the TV or STB 106, through which the client 102, among other operations, can control the TV and/or forward information on selected media content for playback by the TV.

In FIG. 7B, the control panel 704 is an example of a user control panel, through which a user selection of a media entity, and a remote control command modifying display of media content, are sent from the client 102 to the TV and/or STB 106. For example, the control panel 704 allows a user to control the paired TV using conventional remote control functionality, use connected features of the STB or TV (such as features provided by Google TV, including searching for content and accessing the Google TV home screen). The control panel 704 also enables a user to send an item of media content (selected from the media entities returned by the server) to the connected TV or STB for display through use of a "Send page to TV" button.

In FIG. 7C, the track pad 706 is example of a user control panel, through which additional user control commands are sent from the client 102 to the TV and/or STB 106. For example, the track pad 706 allows a user to control the paired TV with greater granularity, such as fast-forwarding or fast-backwarding media content displayed on the TV and/or STB 106, based on user hand gestures on the track pad 706. For example, a fast user swipe on the track pad 706 fast-forwards the media content displayed on the TV and/or STB 106 faster than a slow user swipe.

In FIG. 7D, several media entities are displayed after an along with the control panel 704. For example, when a user is viewing a web page concerning Google TV, media entities (e.g., 708, 710, and 712) related to the Google TV web page are displayed as a lit. Media entities are displayed based on their relevancy (e.g., as indicated by the description) or popularity (e.g., as indicated by the number of views).

In FIG. 7E, after media entity 708 is selected by a user, media entity 708 disappears from the list of media entities (e.g., the list is updated). In some implementations, new media entities are also added, so that the number of media entities on the list does not diminish.

The methods illustrated in FIGS. 4, 5A and 5B may be governed by instructions that are stored in a computer readable storage medium and that are executed by at least one processor of at least one host device (or at least one server). Each of the operations shown in FIGS. 4, 5A and 5B may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first computing device could be termed a second computing device, and, similarly, a second computing device could be termed a first computing device, which changing the meaning of the description, so long as all occurrences of the "first computing device" are renamed consistently and all occurrences of the "second computing device" are renamed consistently. The first computing device, and the second computing device are both computing devices, but they are not the same computing device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
   at a first computing device having one or more processors and memory storing one or more programs for execution by the one or more processors:
   opening an electronic document and obtaining document identifying information for the electronic document, wherein the document identifying information is one of: at least a portion of a network identifier or source code for the electronic document;
   after opening the electronic document, obtaining from a server one or more media entities associated with a subject of the electronic document, including one or more media entities not linked or included in the electronic document;
   displaying, on the first computing device, a representation of at least a subset of the one or more media entities;
   obtaining a user selection from the representation of a respective media entity from the at least a subset of the one or more media entities; and
   in response to the user selection, causing the respective media entity to be displayed.

2. The method of claim 1, wherein the electronic document is an electronic document opened in a document application on the first computing device.

3. The method of claim 2, wherein the document application is a web browser and the electronic document is a web page.

4. The method of claim 1, wherein the one or more programs includes a browser plug-in that performs the method of claim 1.

5. The method of claim 1, further comprising, when the document identifying information includes at least a portion of a media content link associated with the respective media entity, directly obtaining at the first computing device the respective media entity associated with the at least a portion of the media content link, without involvement of the server.

6. The method of claim 1, wherein, when the document identifying information is the at least a portion of a network identifier, the one or more obtained media entities include media entities recognized by a search engine while previously indexing the web page.

7. The method of claim 1, wherein, when the document identifying information is the source code of the electronic document, the one or more obtained media entities include entities obtained by parsing the source code of the electronic document.

8. The method of claim 1, wherein the one or more media entities are obtained based at least in part on one or more filtering criteria.

9. The method of claim 1, further comprising:
obtaining a media entity that is related to the one or more media entities; and
displaying, on the first computing device, a representation of the related media entity.

10. The method of claim 1, wherein:
causing the respective media entity to be displayed includes sending selection information identifying the respective media entity to a second computing device, the second computing device being configured to access and display respective media content corresponding to the respective media entity based on the selection information; and
the sending of the selection information is done via a local connection, from the first computing device, to the second computing device.

11. The method of claim 10, further comprising:
during a display of the respective media content on the second computing device:
receiving, at the first computing device, a second user selection, and
sending a remote control command modifying the display of the respective media content, in accordance with the second user selection, to the second computing device.

12. The method of claim 1, wherein obtaining one or more media entities associated with the electronic document includes:
sending a request to the server for media entities associated with the electronic document, the request including the document identifying information; and
receiving the one or more media entities from the server.

13. A client system, comprising:
one or more processors of a first computing device;
memory; and
one or more programs, wherein the one or more programs are stored in the memory and configured to be executed by the one or more processors, the one or more programs including instructions for:
opening an electronic document and obtaining document identifying information for the electronic document, wherein the document identifying information is one of: at least a portion of a network identifier or source code for the electronic document;
after opening the electronic document, obtaining from a server one or more media entities associated with a subject of the electronic document, including one or more media entities not linked or included in the electronic document;
displaying, on the first computing device, a representation of at least a subset of the one or more media entities;
obtaining a user selection from the representation of a respective media entity from the at least a subset of the one or more media entities; and
in response to the user selection, causing the respective media entity to be displayed.

14. The client system of claim 13, wherein:
the electronic document is an electronic document opened in a document application on the first computing device; and
the document application is a web browser and the electronic document is a web page.

15. The client system of claim 13, wherein the one or more programs includes a browser plug-in that includes the instructions.

16. The client system of claim 13, wherein the one or more program further comprising instructions for:
when the document identifying information includes at least a portion of a media content link associated with the respective media entity, directly obtaining at the first computing device the respective media entity associated with the at least a portion of the media content link, without involvement of the server.

17. A non-transitory computer readable storage medium storing one or more programs, the one or more programs comprising instructions, which when executed by a first computing device with one or more processors, cause the computer system to:
open an electronic document and obtain document identifying information for the electronic document, wherein the document identifying information is one of: at least a portion of a network identifier or source code for the electronic document;
after opening the electronic document, obtain from a server one or more media entities associated with a subject of the electronic document, including one or more media entities not linked or included in the electronic document;
display, on the first computing device, a representation of at least a subset of the one or more media entities;
obtain a user selection from the representation of a respective media entity from the at least a subset of the one or more media entities; and
in response to the user selection, causing the respective media entity to be displayed.

18. The non-transitory computer readable storage medium of claim 17, wherein:
the electronic document is an electronic document opened in a document application on the first computing device; and
the document application is a web browser and the electronic document is a web page.

19. The non-transitory computer readable storage medium of claim 17, wherein the one or more programs includes a browser plug-in that includes the instructions.

20. The non-transitory computer readable storage medium of claim 17, wherein the one or more program further comprising instructions for:
when the document identifying information includes at least a portion of a media content link associated with the respective media entity, directly obtaining at the first computing device the respective media entity associated with the at least a portion of the media content link, without involvement of the server.

* * * * *